(12) United States Patent
Gretz

(10) Patent No.: US 6,780,029 B1
(45) Date of Patent: Aug. 24, 2004

(54) HIGH CONTINUITY ELECTRICAL FITTING

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 86 days.

(21) Appl. No.: 10/256,641

(22) Filed: Sep. 27, 2002

Related U.S. Application Data

(63) Continuation-in-part of application No. 10/053,076, filed on Jan. 17, 2002.

(51) Int. Cl.[7] .................................................. H01R 4/66
(52) U.S. Cl. ........................ 439/92; 174/65 R; 439/939; 439/95; 439/557
(58) Field of Search ................................ 174/51, 65 R, 174/153 G; 439/92–96, 108, 557, 939, 101, 609

(56) References Cited

U.S. PATENT DOCUMENTS

| | | | | |
|---|---|---|---|---|
| 3,814,467 A | * | 6/1974 | Van Buren, Jr. | ............... 285/92 |
| 4,012,578 A | * | 3/1977 | Moran et al. | .................. 174/51 |
| 4,032,178 A | * | 6/1977 | Neuroth | .................... 285/154.2 |
| 4,156,103 A | * | 5/1979 | Dola et al. | ................. 174/65 R |
| 4,198,537 A | * | 4/1980 | Mariani | ..................... 174/65 R |
| 4,773,280 A | * | 9/1988 | Baumgarten | ................ 403/197 |
| 4,990,721 A | * | 2/1991 | Sheehan | .................... 174/65 R |
| 5,373,106 A | | 12/1994 | O'Neil et al. | |
| 5,422,437 A | | 6/1995 | Schnell | |
| 6,043,432 A | | 3/2000 | Gretz | |
| 6,099,350 A | * | 8/2000 | Wright | ....................... 439/582 |
| 6,100,470 A | | 8/2000 | Gretz | |
| 6,538,201 B1 | * | 3/2003 | Gretz | ....................... 174/65 G |
| 6,642,451 B1 | * | 11/2003 | Gretz | ....................... 174/65 G |

\* cited by examiner

*Primary Examiner*—Tho D. Ta
*Assistant Examiner*—Larisa Tsukerman

(57) ABSTRACT

A fitting for securing an electrical cable to an electrically conductive junction box that provides improved electrical continuity between the fitting, the cable, and the junction box. The fitting features a hollow electrical connector having an electrically conductive split snap ring surrounding its leading end. The snap ring includes one or more grounding tangs cantilevered from its outer circumference and a locking tang lanced from each grounding tang. By providing locking tangs integral with the grounding tangs, a greater portion of the periphery of the snap ring is available for forming the grounding tang. The larger grounding tangs provide much greater surface contact between the grounding tangs and the junction box, thereby improving continuity and lowering the millivolt drop. Electrical continuity is further enhanced by the design of the grounding tangs, which extend from the snap ring at a rising slope to a crest and then at a downward slope to their free ends thereby enabling the downward slope portion of the grounding tangs to pull against the surrounding walls of the junction box and draw the fitting tight against the side of the box.

7 Claims, 4 Drawing Sheets

HIGH CONTINUITY ELECTRICAL FITTING

This application is a Continuation-In-Part of U.S. patent application Ser. No. 10/053,076 entitled "Snap Tight Fitting with Improved Continuity", filed Jan. 17, 2002 and still pending.

FIELD OF THE INVENTION

This invention relates to fittings for connecting electrical cables to a panel and specifically to an improved fitting that provides improved electrical continuity and low millivolt drop between the fitting, the cable, and the junction box.

BACKGROUND OF THE INVENTION

Historically, the most common form of attaching cable and electrical metal tubing (EMT) to electrical junction boxes was by means of an interior-threaded lock nut, which is screwed onto the exterior-threaded electrical fitting that extends into the junction box.

Recently, snap fitting connectors have become popular as a means of connecting cables to electrical junction boxes. One such type of snap fitting is disclosed in U.S. Pat. No. 5,373,106 (hereinafter the '106 patent) issued Dec. 13, 1994, and entitled "Snap In Cable Connector". This patent disclosed a quick connect fitting for an electrical junction box including a spring steel spring member that improved the ease of use and reduced the time involved in securing electrical connectors to electrical junction boxes. This application also disclosed the use of outward-bent tensioner tangs to provide electrical continuity or ground between the electrical connector, the junction box, and the source leading to the box as an integral part of the design of the connector.

An improved snap fitting was disclosed in U.S. patent application Ser. No. 10/053,076 (hereinafter Ser. No. 10/056,076), filed Jan. 17, 2002 and incorporated herein by reference. The snap fitting improved the functionality of the quick connect fitting by providing a spring steel snap ring with a grounding tang of a novel design that provided a tighter fit between the quick connect fitting and the junction box or panel that it connected to. The snap fitting of Ser. No. 10/053,076 therefore improved the electrical continuity and lowered the millivolt drop between the fitting, the cable, and the junction box.

Although the snap fitting of Ser. No. 10/056,076 provided a quick connect fitting with improved continuity, the present invention further improves the continuity of the quick connect fitting by providing a snap ring including a locking tang lanced out of the grounding tang. By lancing the locking tang out of the grounding tang, a greater portion of the outer periphery of the snap ring is available for forming the grounding tang. The larger grounding tangs provide more contact between the junction box and the snap ring thereby providing increased conductivity. The improved snap fitting of the present invention therefore provides improved electrical continuity and a lower millivolt drop between the fitting, the cable, and the junction box.

These and other advantages will become apparent by reading the attached specification and claims in conjunction with reference to the attached drawings.

SUMMARY OF THE INVENTION

The present invention comprises a fitting that exhibits improved electrical continuity between the fitting, the cable, and the junction box. The fitting features a hollow electrical connector having an electrically conductive spring member surrounding its leading end. The member includes one or more grounding tangs cantilevered from its outer circumference. Locking tangs are lanced from the grounding tangs. By providing locking tangs integral with the grounding tangs, a greater portion of the periphery of the snap ring is available for forming the grounding tang. The larger grounding tangs provide much greater surface contact area between the grounding tangs and the junction box, thereby improving continuity and lowering the millivolt drop.

Figure 9:
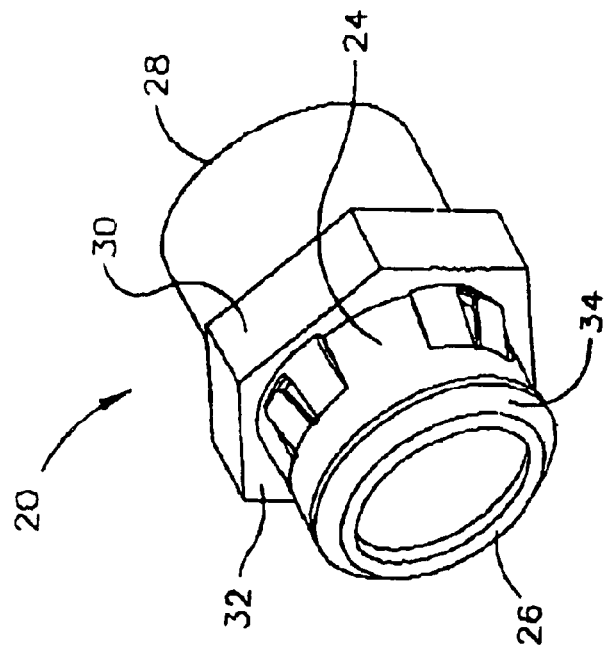
FIG. 9 is a perspective view of the preferred embodiment of a fitting according to the present invention.

INDEX TO REFERENCE NUMERALS IN DRAWINGS 20 fitting
22 hollow electrical connector
24 snap ring
26 leading end of connector
28 trailing end of connector
30 central flange
32 leading face
34 forward flange
36 seat
38 leading end of snap ring
40 trailing end of snap ring
42 longitudinal axis of snap ring
44 grounding tang
46 locking tang
48 blank
50 slits
51 U-shaped slots
52 hole
54 end (of blank)
56 end (of blank)
58 leading end of grounding tang
60 free trailing end of grounding tang
62 leading end of locking tang
64 free trailing end of locking tang
66 gap
68 rising slope portion
70 crest
72 downward slope portion
74 access aperture
76 junction box 78 surrounding wall
79 junction box wall
80 outer periphery of snap ring

DETAILED DESCRIPTION OF THE INVENTION

The present invention comprises a fitting for connecting an electrical cable to a panel or junction box and providing improved electrical continuity between the fitting, the cable, and an electrically conductive electrical junction box. This invention relates to and incorporates herein by reference in its entirety pending U.S. application Ser. No. 10/053,076 filed Jan. 17, 2002 and titled "Snap Tight Fitting with Improved Continuity".

Referring to FIG. 9, the fitting 20 of the present invention includes a hollow electrical connector 22 and a split snap ring 24 that snapped onto the leading end 26 of the connector 22. The electrical connector 22 also includes a trailing end 28, a central flange 30 having a leading face 32, and a forward flange 34.

Figure 1:
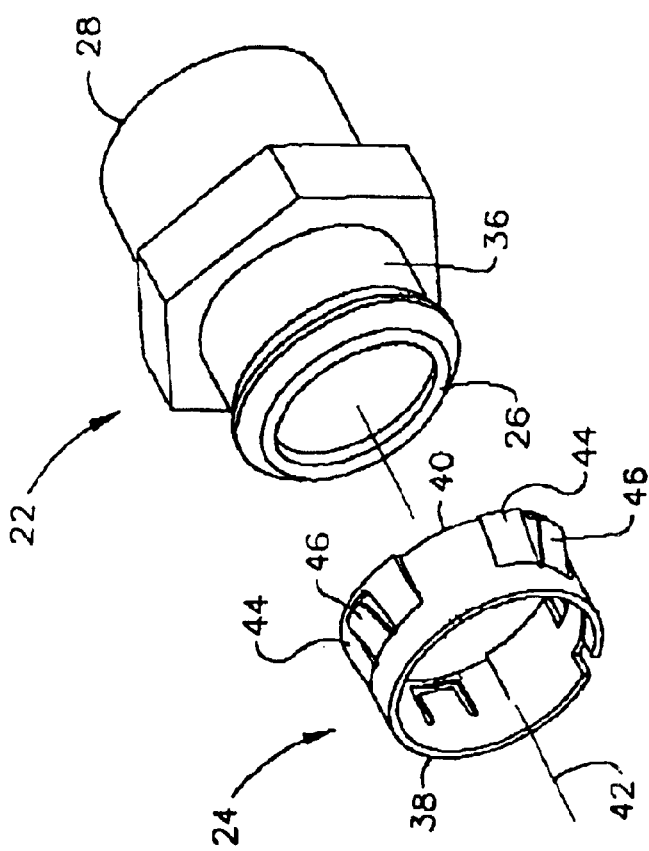
FIG. 1 is an exploded perspective view of a preferred embodiment of a fitting according to the present invention including a snap ring exploded away from a hollow electrical connector.

Referring to FIG. 1, a seat 36 is disposed on the forward portion of the connector 22 and is defined by a recessed area between the central 30 and forward 34 flanges. The cylindrical split snap ring 24, typically constructed of spring steel and of a smaller diameter than the outer diameter of the seat 36 of the connector 22, includes a leading end 38, a trailing end 40, and a longitudinal axis 42. The snap ring 24 includes one or more grounding tangs 44 lanced longitudinally from its trailing end 40 and a locking tang 46 lanced longitudinally from within each grounding tang 44. The grounding tangs 44 are bent outwards from the cylindrical body of the snap ring 24 and the locking tangs 46 are bent outwards from the grounding tang 44.

Figure 3:
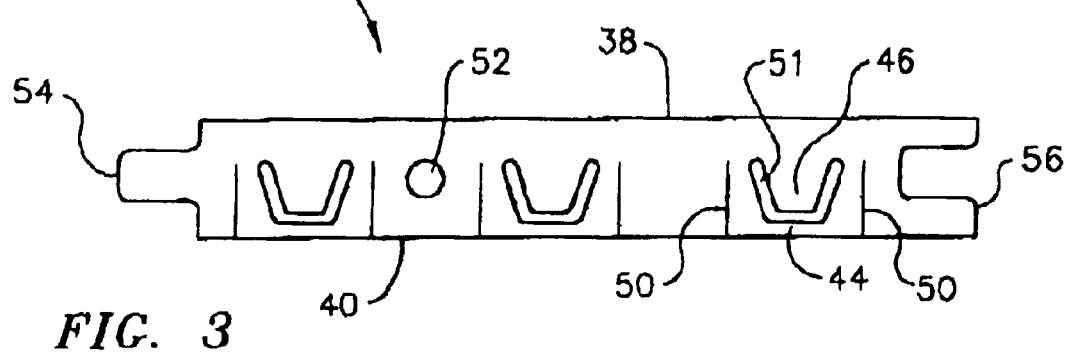
FIG. 3 is a plan view of the preferred embodiment of a blank that has been stamped out and will be formed into the snap ring of the present invention.
Figure 4:
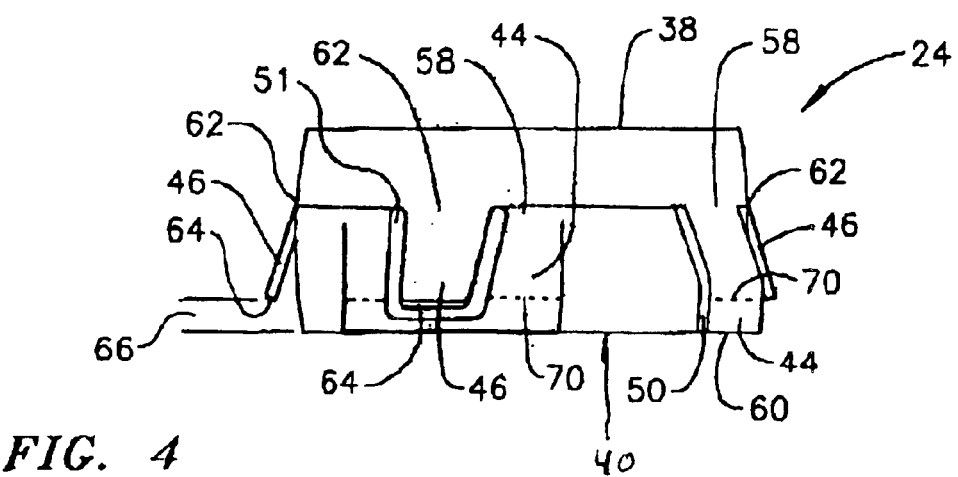
FIG. 4 is a side view of the preferred embodiment of a snap ring according to the present invention.

Now referring to FIGS. 3 and 4, the split snap ring is typically constructed from a flat blank 48 of spring steel and then formed into the cylindrical shaped split snap ring 24 as shown in FIG. 4. The blank 48 is typically stamped out of the parent sheet metal and includes slits 50 from the trailing end 40 to define the areas of the blank 48 that will be bent outwards to form the grounding tangs 44. U-shaped slots 51 are stamped out of each grounding tang 44 to provide the locking tangs 46. A hole 52 is provided in the blank 48 to provide a means for locking the blank in a mandrel (not shown) to form the blank 48 into the cylindrical-shaped split snap ring. The blank includes one end 54 that dovetails into the second end 56 when formed into a cylindrical shape.

Referring to FIG. 4, the grounding tangs 44 include a leading end 58 that, after being bent outwards from the snap ring 24, is cantilevered from the surface of the snap ring 24. The opposite end of the grounding tang 44 is a free end 60 that is oriented toward the trailing end 40 of the snap ring. The locking tangs 46 are bent outwards of the grounding tangs 44 and include a leading end 62 that is cantilevered from the grounding tang 44 and the main portion of the snap ring 24. The trailing end of the locking tangs 46 forms a free trailing end 64 that extends to a wider diameter than the free end of the grounding tangs 44. A gap 66, defined as the distance between the free end 64 of the locking tang 46 and the trailing end 40 of the snap ring 24, is of a size slightly larger than the thickness of a panel or junction box that the fitting (not shown) will be used with.

Once formed into its cylindrical shape then, the split snap ring 24 therefore includes, as shown in FIG. 4, a leading end 38, a trailing end 40, grounding tangs 44 having a leading end 58 and a free trailing end 60, locking tangs 46 having a leading end 62 and a free trailing end 64, and a gap 66 between the free end 64 of the locking tang 46 and the trailing end 40 of the snap ring 24.

Figure 2:
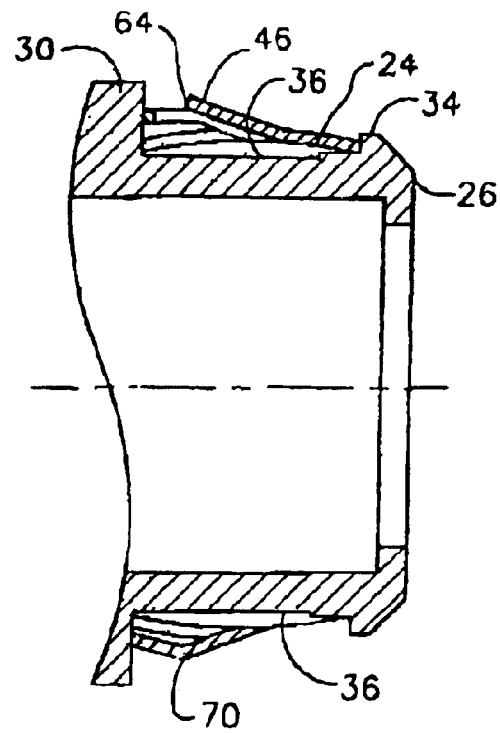
FIG. 2 is a sectional view of the fitting of FIG. 1.

To form the fitting 20 of the present invention, as shown in the sectional view of the fitting in FIG. 2, the cylindrical-shaped split snap ring 24 is pushed over the forward flange 34 of the hollow electrical connector 22 and snaps onto the seat 36 between the central 30 and forward 34 flanges. The snap ring 24, being formed of spring steel and of a smaller diameter than the seat 36, returns to its unbiased state after passing over the forward flange and holds tightly on the seat.

Figure 6:
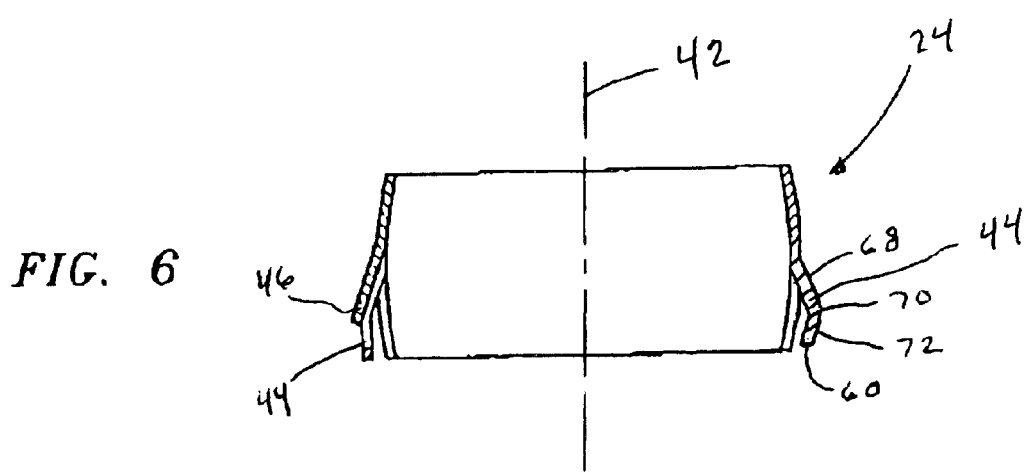
FIG. 6 is a sectional view of the snap ring taken along line 6—6 of FIG. 5.

Referring to FIG. 6, the grounding tangs 44 are bent outwards with a rising slope portion 68 near their cantilevered leading end 58, to a crest 70, and then with a downward slope portion 72 at their trailing free end 60.

Referring to FIGS. 1 and 9, the fitting 20 of the present invention is formed by slipping the split snap ring 24 onto the seat 36 of the electrical connector 22. The assembled fitting 20 then, an exploded view of which is shown in FIG. 8, may be aligned with an access aperture 74 in a junction box 76 and simply snapped into the access aperture 74.

Figure 5:
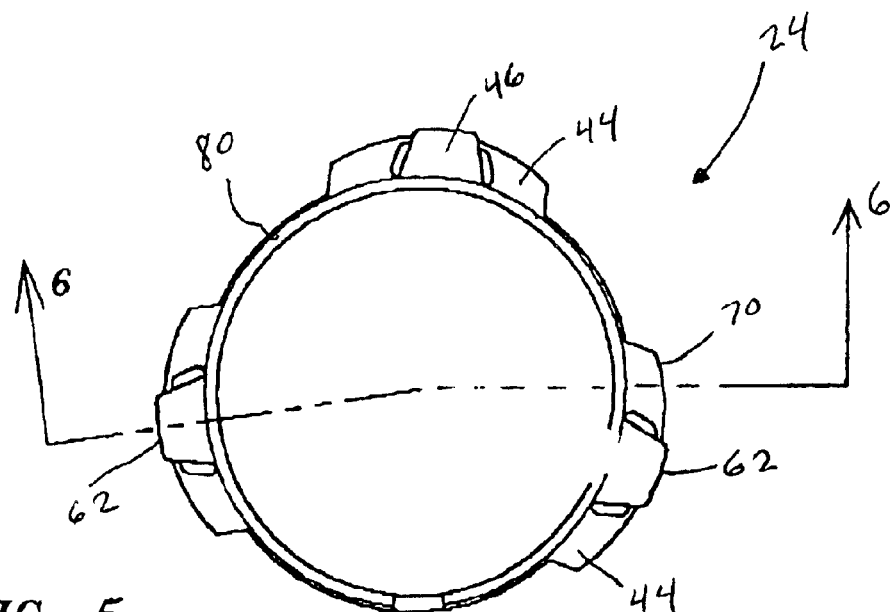
FIG. 5 is a top view of the snap ring taken from the top of FIG. 4.

Now referring to FIG. 5, the snap ring 24, as viewed from the leading end 38 or from the top of FIG. 4, includes grounding tangs 44 bent outwards with the crest 70 of the grounding tangs 44 extending to a wider diameter than the snap ring 24 and the free trailing ends 64 of the locking tangs 46 extending to a wider diameter than the crest 70 of the grounding tangs 44. The sectional view in FIG. 2 depicts the outward extension of the crest 70 of the grounding tangs 44 and the free trailing end 64 of the locking tangs 46 after the snap ring 24 has been snapped onto the seat 36 of the electrical connector 22.

After the snap ring 24 is placed on the seat 36 of the electrical connector 22 to form the fitting 20 of the present invention, the fitting 20 may be snapped into an access aperture in a panel or junction box. One typical standard access aperture in a junction box has a diameter of 0.875 inch The free end 64 of the locking tangs 46 extend outward to a diameter of typically 1.0 inch and the crest 70 of the grounding tangs 44 extend to a diameter slightly less than 1.0 inch.

Figure 8:
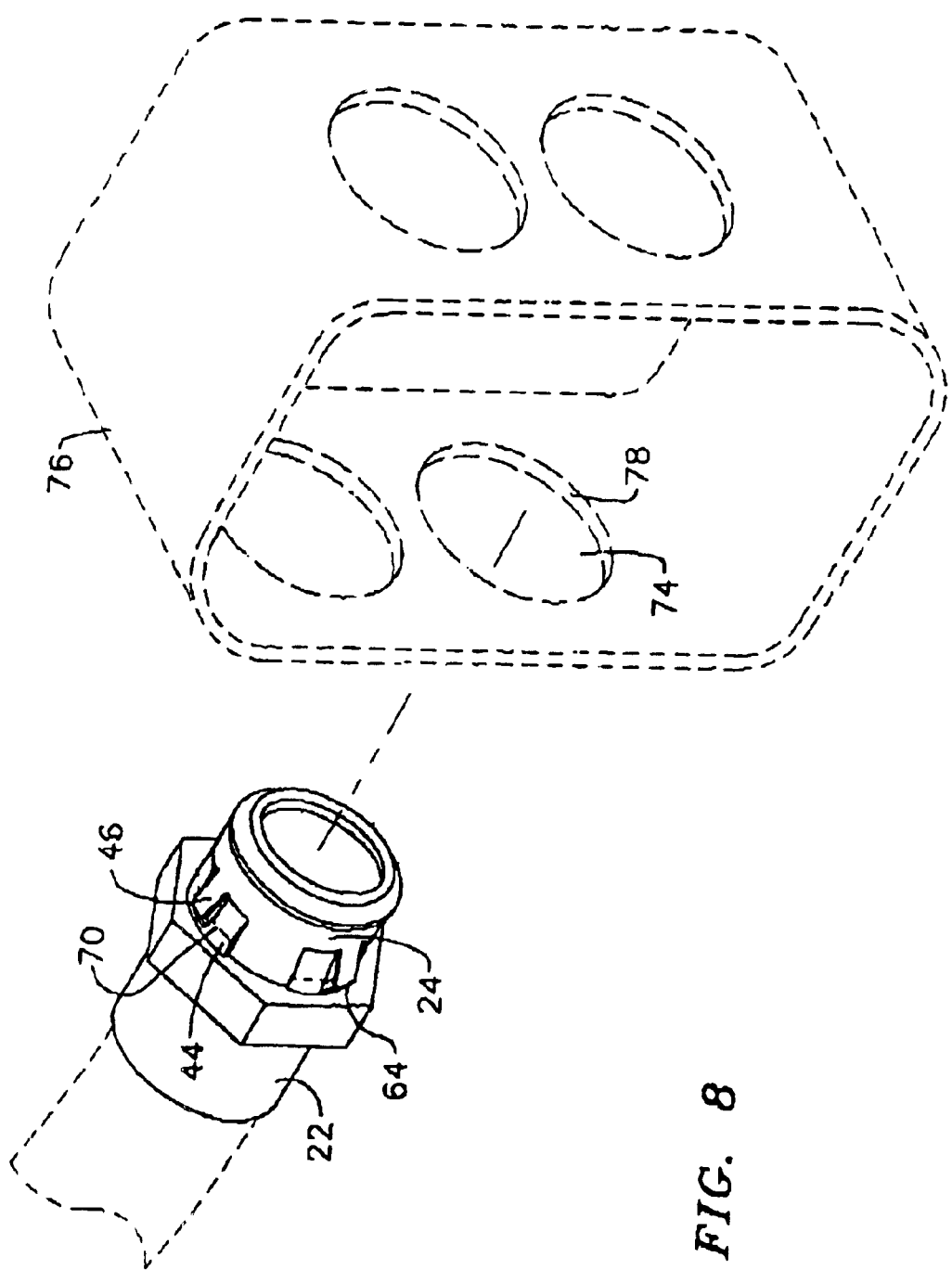
FIG. 8 is a exploded perspective view of the preferred embodiment of the snap ring shown in alignment with an electrical connector, an electrical cable, and a junction box.

Referring now to FIG. 8, as the fitting is pushed into the access aperture 74, the surrounding wall 78 of the access aperture compresses first the locking tangs 46 and then contacts the crest 70 and compresses the grounding tangs 44. Eventually, since the gap (not shown) between the free end 64 of the locking tang 46 and the trailing end 40 of the snap ring 24 typically measures 0.80 inch and the wall of a standard size junction box is typically 0.060 inch, the free ends 64 of the locking tangs 46 spring free of the surrounding wall 78 and snap to their unbiased outward extent, thereby locking the fitting 20 into the junction box 76.

Figure 7:
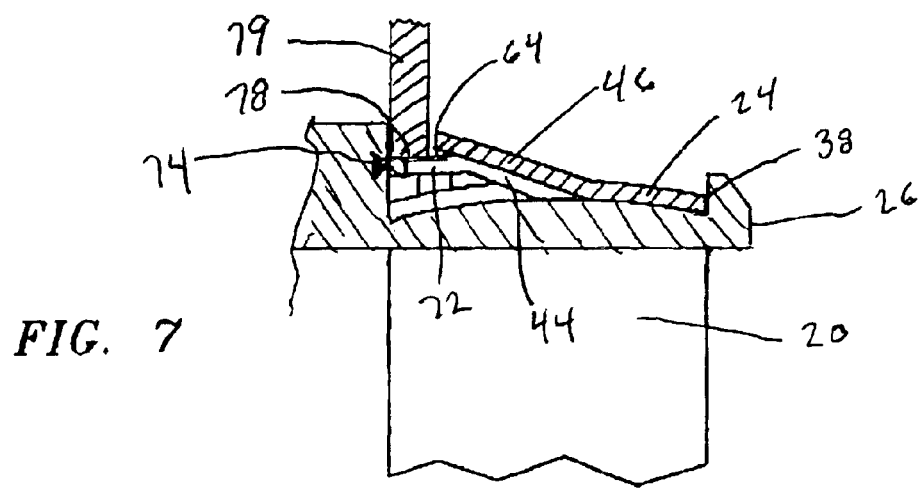
FIG. 7 is a sectional view of a portion of the fitting of FIG. 1 shown secured in a panel.

Referring now to FIG. 7, a sectional view is depicted of a portion of the fitting 20 of the present invention snapped into a junction box wall 79. The free end 64 of the locking tang 46 holds the fitting 20 within the box or panel. As a result of the snap ring 24 being formed of spring steel, and snapping outwards beyond the surrounding wall 78 of the access aperture, the fitting 20 is held firmly within the box and meets the requirements of the National Electrical Code for resisting withdrawal forces exerted on the fitting 20 or cable (not shown) connected to the fitting 20.

Referring to FIG. 4, the crest 70 of the grounding tangs 44 is located closer to the leading end 38 of the snap ring 24 than is the free end 64 of the locking tang 46. Therefore, referring to FIG. 7, as the leading end 38 of the snap ring 24 is advanced into the access aperture 74 and the locking tang 46 passes the surrounding wall 78 and maps free, the grounding tangs 44 contact the surrounding wall 78 on their downward slope portion 72. Contact between the downward slope portion 72 of the grounding tangs 44 and the surrounding wall 78 tends to draw the fitting 20 toward the box 76 and holds it tightly therein. The downward slope 72 of the grounding tangs 44 also enable a good surface contact between the grounding tangs 44 and the surrounding wall 78, raising the continuity and providing a low millivolt drop between the fitting 20 and the junction box 76.

Referring to FIG. 5, the preferred embodiment of the snap ring 24 includes three grounding tangs 44 spaced evenly, or at intervals of about 120°, around the periphery 80 of the snap ring 24 as shown. The snap ring 24 is typically 2.5 inches in circumference and the grounding tangs 44 are typically at least 1.3 inches in width. The grounding tangs 44 therefore comprise at least 50% of the outer periphery 80 of the snap ring 24. The width of the grounding tangs 44 therefore contributes to the surface contact between the grounding tangs 44 and the junction box (not shown), considerably improving the continuity between the fitting (not shown) and the box.

When the fitting 20 is installed in the box 76 then, as depicted in FIG. 7, the wide grounding tangs 44 enable at least 50% of the outer periphery of the snap ring 24 to be in intimate contact with the surrounding wall 78 of the junction box. This enhanced surface area contact improves the continuity over previous versions of the fitting.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A fitting for an electrically conductive electrical junction box comprising:
   a hollow tubular electrical connector including a leading end, a trailing end, a central flange having a leading face, and a seat disposed forward of said central flange;
   a resilient, electrically conductive, cylindrical-shaped split snap ring disposed on said seat and including a leading end, a trailing end, and a longitudinal axis;
   one or more grounding tangs lanced longitudinally from said trailing end of said snap ring, said grounding tang bent outwards from said snap ring thereby forming a leading end cantilevered from said snap ring and a free trailing end;
   a locking tang lanced longitudinally from said grounding tang, said locking tang bent outwards from said grounding tang thereby forming a leading end cantilevered from said grounding tang and a free trailing end with the distance between said free trailing end of said locking tang and said trailing end of said snap ring slightly larger than the thickness of a panel or junction box wall that it will be secured to; and
   said grounding tang and said locking tang bent outwards to a greater diameter than the diameter of an access aperture in a panel that said fitting will be used in conjunction with.

2. The fitting of claim 1 wherein said grounding tang includes a rising slope at said leading end, a downward slope at said trailing end, and a crest separating said rising slope and said downward slope thereby allowing said grounding tang to spring inward as said leading end of said electrical connector is inserted in said access aperture in said panel and further allowing said grounding tang to spring outward after said crest clears the walls of said access aperture thereby enabling said grounding tang to draw said leading face of said electrical connector against said panel.

3. The fitting of claim 1 wherein said split snap ring is constructed of spring steel.

4. The fitting of claim 1 wherein said hollow tubular electrical connector is constructed of a polymeric material such as PVC, polycarbonate, or ABS.

5. The fitting of claim 1 wherein said grounding tangs comprise at least 50% of the outer periphery of said snap ring.

6. The fitting of claim 1 wherein said distance between said free trailing end of said locking tang and said trailing end of said snap ring is approximately 0.080 inches.

7. A method for quickly connecting fittings to electrical junction boxes consisting of the steps of:
   providing an electrically conducting electrical junction box with an access aperture;
   providing an electrical connector having a leading end for insertion in said access aperture and a face limiting the distance said connector may be inserted therein;
   providing a cylindrical-shaped electrically conductive split snap ring surrounding said leading end of said electrical connector with said snap ring having a leading end and a trailing end;
   providing at least one grounding tang integral with and supported at one end from said snap ring and free at its opposite end, said grounding tang having a rising slope portion at said supported end, a downward slope portion at said trailing end and a crest separating said rising slope and said downward slope with said crest and said downward slope portion having a relaxed outer dimension greater than the diameter of said access aperture;
   providing at least one locking tang lanced from said grounding tang, said locking tans having a relaxed outer dimension greater than the diameter of said access aperture; and
   inserting end of said electrical connector with said surrounding spring member into said hole until said crest of said grounding tang clears said hole and said grounding tang draws said face of said electrical connector against said junction box.

* * * * *